(12) United States Patent
Naim (10) Patent No.: US 9,531,500 B1
(45) Date of Patent: Dec. 27, 2016

(54) SYSTEMS AND METHODS FOR DETERMINING FRAME STRUCTURES FOR FREQUENCY BANDS

(71) Applicant: Sprint Spectrum LP, Overland Park, KS (US)

(72) Inventor: Muhammad Ahsan Naim, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 56 days.

(21) Appl. No.: 14/517,121

(22) Filed: Oct. 17, 2014

(51) Int. Cl.
*H04W 4/00* (2009.01)
*H04L 1/00* (2006.01)
*H04W 72/08* (2009.01)
*H04W 72/04* (2009.01)

(52) U.S. Cl.
CPC ........ *H04L 1/0006* (2013.01); *H04W 72/0453* (2013.01); *H04W 72/082* (2013.01)

(58) Field of Classification Search
CPC H04L 1/0006; H04W 72/0543; H04W 72/082
See application file for complete search history.

(56) References Cited

U.S. PATENT DOCUMENTS

| | | |
|---|---|---|
| 2011/0032850 A1 | 2/2011 | Cai |
| 2012/0120854 A1 | 5/2012 | Zhang et al. |
| 2012/0140730 A1* | 6/2012 | Marks .................. H04L 5/0007 370/330 |
| 2013/0301423 A1 | 11/2013 | Sirotkin et al. |
| 2015/0271847 A1* | 9/2015 | Luo ..................... H04W 74/002 370/329 |
| 2015/0296385 A1* | 10/2015 | Zhang .................. H04W 16/14 370/329 |
| 2015/0296544 A1* | 10/2015 | Kim ...................... H04W 56/00 370/329 |
| 2015/0365830 A1* | 12/2015 | Wei ....................... H04J 3/1694 370/280 |

* cited by examiner

*Primary Examiner* — Abdelnabi Musa (57) ABSTRACT

Systems and methods are described for determining structures for frequency bands. A signal area for an access node may be partitioned into a first partition and a second partition, wherein a first antenna is associated with the first partition and a second antenna is associated with the second partition. The first partition may be assigned a first frequency band and a third frequency band, and the second partition may be assigned a second frequency band and a fourth frequency band. A first frame structure may be selected for the first frequency band, a second frame structure may be selected for the second frequency band, a third frame structure may be selected for the third frequency band, and a fourth frame structure may be selected for the fourth frequency band, wherein the first frame structure differs from the third frame structure and the second frame structure differs from the fourth frame structure. Additionally, data may be communicated between the access node and a plurality of devices over each of the first, second, third, and fourth frequency bands using each respective frame structure selected for each frequency band.

20 Claims, 7 Drawing Sheets

FIG. 7 ing node, and location registers such
SYSTEMS AND METHODS FOR DETERMINING FRAME STRUCTURES FOR FREQUENCY BANDS

TECHNICAL BACKGROUND

Telecommunication systems, such as cellular networks or other wireless networks, use various network links throughout the network to communicate. For example, an access node may use a network link to communicate with another access node while using a separate network link to communicate with another processing node. Accordingly, the system may rely on a well-established network to provide efficient communication services.

In certain circumstances, a portion of the network may experience high load (e.g., load above a threshold) or interference conditions. For example, a communication link may experience large amount of data traffic or interference conditions may render a communication link less effective, and the efficiency of the system may suffer. Accordingly, a system that effectively balances load and considers interference conditions may be able to provide a high quality service to users of the system.

Overview

Systems and methods are described for determining frame structures for frequency bands. A signal area for an access node may be partitioned into a first partition and a second partition, wherein a first antenna is associated with the first partition and a second antenna is associated with the second partition. The first partition may be assigned a first frequency band and a third frequency band, and the second partition may be assigned a second frequency band and a fourth frequency band. A first frame structure may be selected for the first frequency band, a second frame structure may be selected for the second frequency band, a third frame structure may be selected for the third frequency band, and a fourth frame structure may be selected for the fourth frequency band, wherein the first frame structure differs from the third frame structure and the second frame structure differs from the fourth frame structure. Additionally, data may be communicated between the access node and a plurality of devices over each of the first, second, third, and fourth frequency bands using each respective frame structure selected for each frequency band.

DETAILED DESCRIPTION

Figure 1:
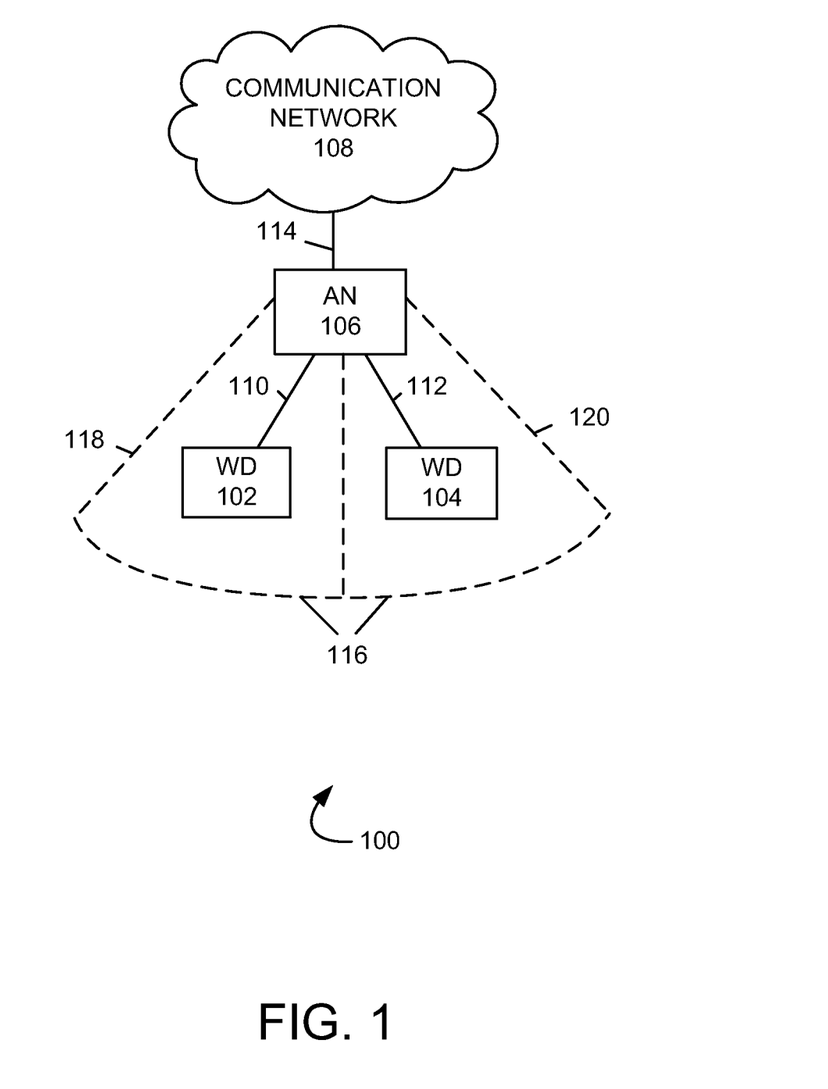
FIG. 1 illustrates an exemplary communication system to determine frame structures for frequency bands.

FIG. 1 illustrates an exemplary communication system 100 to determine frame structures for frequency bands comprising wireless devices 102 and 104, access node 106, communication network 108, communication links 110, 112, and 114, signal area 116, and signal area partitions 118 and 120. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication with access node 106 which are omitted for clarity, including additional processing nodes, routers, gateways, and physical and/or wireless data links for carrying data among the various network elements.

Wireless devices 102 and 104 can be any device configured to communicate over communication system 100 using a wireless communication link. For example, wireless devices 102 and 104 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with each of access nodes 106, any number of wireless devices can be implemented.

Access node 106 is a network node capable of providing wireless communications to wireless devices 102 and 104, and can be, for example, a base transceiver station, a radio base station, or an eNodeB device. Access node 106 may communicate with communication network 108 over communication link 114. Access node 106 may comprise one or more antennas. An antenna may comprise an electrical device or component that transforms electric power into radio waves. One or more antennas of access node 106 may transmit signals over a signal area for the access node and/or receive signals from wireless devices (e.g., wireless devices 102 and 104). In an embodiment, one or more antennas may be used to provide wireless services over a signal area for a particular sector of access node 106.

Although only access node 106 is illustrated in FIG. 1, wireless devices 102 and 104 can be in communication with a plurality of access nodes and/or relay nodes. The plurality of access nodes and/or relay nodes can be associated with different networks and can support different communication protocols and radio access technologies. The access nodes and/or relay nodes may communicate directly over one or more communication links.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying voice information and other information, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or some other type of communication equipment, and combinations thereof.

Communication links 110, 112, and 114 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

Signal area 116 may comprise an area around access node 106 where a wireless device may detect wireless signals transmitted from the access node (e.g., detect at a signal level above a threshold). For example, signal area 116 may comprise a coverage area for access node 106. In an embodiment, signal area 116 may be a predefined area over which access node 106 provides wireless services to wireless devices. For example, signal area 116 may comprise a cell and/or sector of access node 106. Signal area partitions 118 and 120 may comprise two partition areas that comprise signal area 116. Accordingly, signal area partitions 118 and 120 may comprise partitions of a signal area, sector, or cell of access node 106.

In operation, access node 106 may establish communication with wireless devices 102 and 104 such that access node 106 provides the wireless devices access to a communication network (e.g., communication network 108). In an embodiment, system 100 may use a plurality of carriers in order to provide wireless communication services. A plurality of carriers that comprise bandwidth for wireless communications (e.g., 2.5 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, access node 106 may communicate with wireless devices 102 and 104 using a time division duplex (TDD) system. For example, in TDD system, a frame may comprise a number of subframes (e.g. Transmission Time Intervals, TTIs) that include a mix of uplink subframes and downlink subframes. In some embodiments, a special subframe may also be used, for instance, as a guard between an uplink subframe and a downlink subframe or for any other suitable purpose. When using a TDD structure, an uplink subframe and a downlink subframe may be transmitted over the same frequency but at different times.

Access node 106 may use one or more frame structures to communicate with wireless devices 102 and 104. In an embodiment, a frame structure may comprise uplink subframes, downlink subframes, and special subframes, where each frame structure may comprise a different mix of subframes. For example, a first frame structure may comprise 10 subframes, where the order of subframes may comprise downlink, special, uplink, uplink, downlink, downlink, special, uplink, uplink, and downlink. A second frame structure may comprise 10 subframes, where the order of subframes may comprise downlink, special, uplink, uplink, downlink, downlink, downlink, downlink, downlink, and downlink. Other frame structures may comprise various other mixes of special, downlink, and uplink configurations.

In an embodiment, allowing multiple frame structures to be used within a signal area (e.g., sector) may be beneficial. For example, system 100 may benefit from using a first frame structure that comprises a minimum number of downlink subframes and a second frame structure that comprises a minimum number of uplink subframes. However, where contiguous blocks of spectrum (e.g., contiguous frequency bands) implement different frame structures within a signal area (e.g., sector), interference may degrade channel qualities in certain circumstances. Accordingly, a system that enables multiple frame structures to be used within a signal area may provide enhanced wireless services.

Systems and methods are described for determining frame structures for frequency bands. A signal area for an access node may be partitioned into a first partition and a second partition, wherein a first antenna is associated with the first partition and a second antenna is associated with the second partition. The first partition may be assigned a first frequency band and a third frequency band, and the second partition may be assigned a second frequency band and a fourth frequency band. A first frame structure may be selected for the first frequency band, a second frame structure may be selected for the second frequency band, a third frame structure may be selected for the third frequency band, and a fourth frame structure may be selected for the fourth frequency band, wherein the first frame structure differs from the third frame structure and the second frame structure differs from the fourth frame structure. Additionally, data may be communicated between the access node and a plurality of devices over each of the first, second, third, and fourth frequency bands using each respective frame structure selected for each frequency band.

Figure 2:
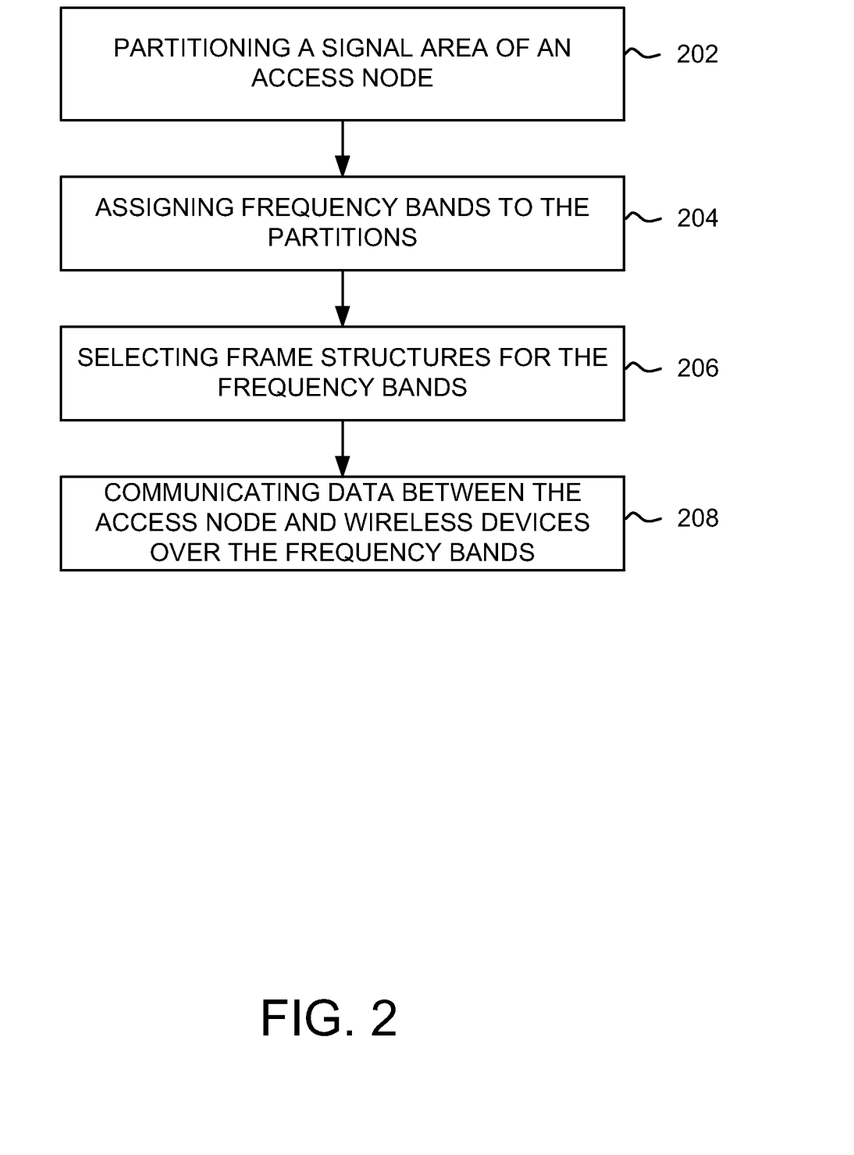
FIG. 2 illustrates an exemplary method of determining frame structures for frequency bands.

FIG. 2 illustrates an exemplary method for determining frame structures for frequency bands. The method will be discussed with reference to the exemplary communication system 100 illustrated in FIG. 1, however, the method can be implemented with any suitable communication system.

Referring to FIG. 2, at step 202, a signal area may be partitioned into a first partition and a second partition, wherein a first antenna is associated with the first partition and a second antenna is associated with the second partition. For example, signal area 116 may be partitioned in partition 118 and partition 120. Signal area 116 may be partitioned based on geographical area for the signal area where partitions 118 and 120 may each cover a threshold amount of geographic area. In another example, signal area 116 may be partitioned based on wireless devices within the signal area (e.g., based on historic data), where partitions 118 and 120 may each encompass a threshold number of wireless devices (e.g., threshold number of estimated wireless devices based on historic data). Signal area 116 may also be partitioned in any other suitable manner.

In an embodiment, access node 106 may comprise a plurality of antennas. Partition 118 may be associated with a first antenna and partition 120 may be associated with a second antenna. In some embodiments, partition 118 may be associated with a plurality of first antennas and partition 120 may be associated with a plurality of second antennas.

At step 204, the first partition may be assigned a first frequency band and a third frequency band and the second partition may be assigned a second frequency band and a fourth frequency band. For example, access node 106 may communicate using a plurality of frequency bands, and at least a first, second, third, and fourth frequency band. Each frequency band may comprise a determined Mhz bandwidth (e.g., 5 Mhz, 10 Mhz, 15 Mhz, 20 Mhz, and the like). Partition 118 may be assigned a first frequency band and a third frequency band and partition 120 may be assigned a second frequency band and a fourth frequency band.

In an embodiment, the first, second, third, and fourth frequency bands may comprise a contiguous block of spectrum (e.g., contiguous frequency bands). In a further embodiment, the contiguous block of spectrum may be in order from the first frequency band to the fourth frequency band. For example, the first frequency band may be adjacent to the second frequency band, the second frequency band may be adjacent to the third frequency band, and the third frequency band may be adjacent to the fourth frequency band.

At step 206, frame structures may be selected for the frequency bands, where a first frame structure may be selected for the first frequency band, a second frame structure may be selected for the second frequency band, a third frame structure may be selected for the third frequency band, and a fourth frame structure may be selected for the fourth frequency band, and where the first frame structure differs from the third frame structure and the second frame structure differs from the fourth frame structure. For example, the first frame structure and the third frame structure may be used by access node 106 for communications with wireless devices served within partition 118 (e.g. connected to partition 118) and the second frame structure and the fourth frame structure may be used by access node 106 for communications with wireless devices served within partition 120 (e.g., connected to partition 120).

At step 208, data may be communicated between the access node and a plurality of wireless devices over each of the first, second, third, and fourth frequency bands using each respective frame structure selected for each frequency band. For example, access node 106 may communicate with a plurality of wireless devices (e.g., wireless device 102) served within partition 118 (e.g., connected to partition 118) over the first frequency band using the first frame structure and/or over the third frequency band using the third frame structure. In another example, access node 106 may communicate with a plurality of wireless devices (e.g., wireless device 104) served within partition 120 (e.g., connected to partition 120) over the second frequency band using the second frame structure and/or over the fourth frequency band using the fourth frame structure. In an embodiment, the communication may comprise communicating data from access node 106 to a wireless device (e.g., downlink communication) using a downlink subframe and communicating data from a wireless device to access node 106 (e.g., uplink communication) using an uplink subframe.

In an embodiment, the partitioning of signal area 116 may be different from the sectorization of an access node. For example, each partition may be associated with one or more antennas. In an embodiment, when an antenna is associated with a first partition, the antenna may provide wireless services (e.g., to wireless devices) over the first partition, but may not provide wireless services over the second partition. In this example, a signal strength loss may be experienced where only a subset of antennas at an access node provide wireless services over a particular partition. For certain embodiments, the frame structures selected for each partition (e.g., selected for each frequency band assigned to each partition) may be used to compensate for the single strength loss. In this example, using a mix of frame structures within a particular partition may achieve this compensation. Additionally, signal area 116 may comprise a sector of an access node, and the partitions may comprise partitions of the sector in some embodiments.

Figure 3:
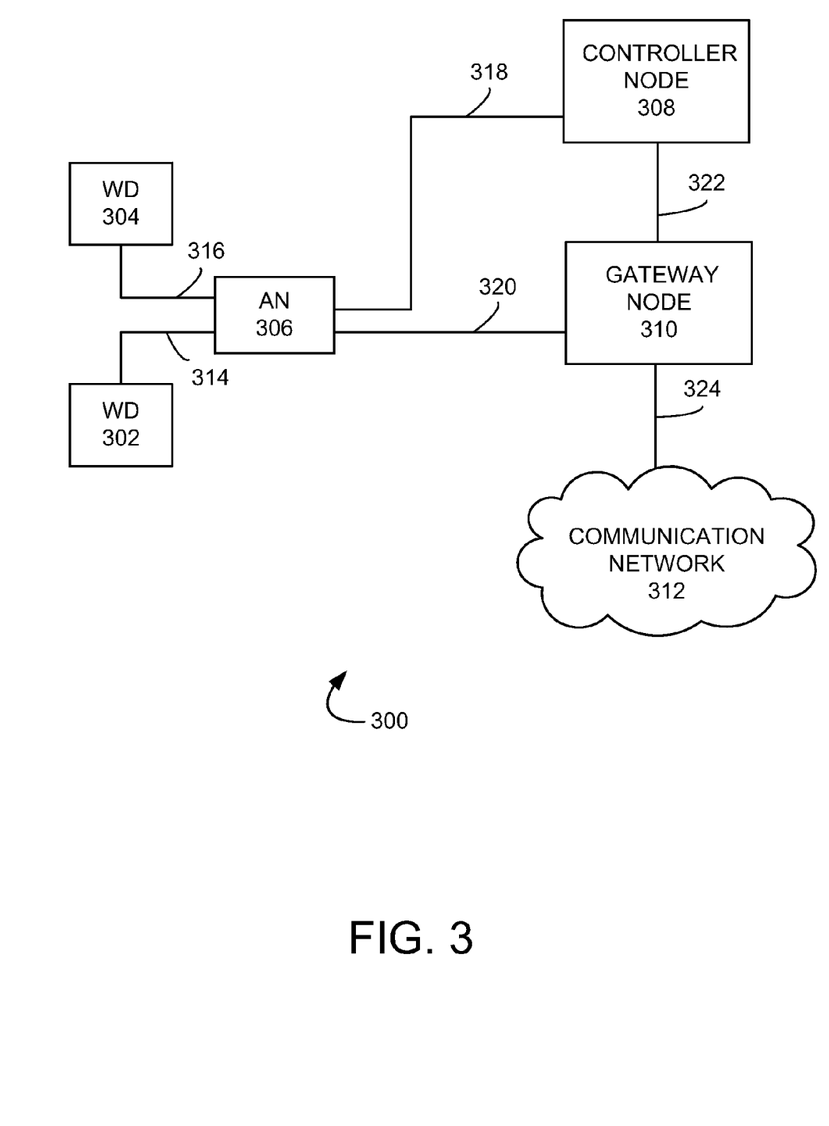
FIG. 3 illustrates another exemplary communication system to determine frame structures for frequency bands.

FIG. 3 illustrates another exemplary communication system 300 to determine frame structures for frequency bands. Communication system 300 may comprise wireless devices 302 and 304, access node 306, controller node 308, gateway node 310, communication network 312, and communication links 314, 316, 318, 320, 322, and 324. Other network elements may be present in the communication system 300 to facilitate communication but are omitted for clarity, such as base stations, base station controllers, gateways, mobile switching centers, dispatch application processors, and location registers such as a home location register or visitor location register.

Wireless devices 302 and 304 can be any device configured to communicate over communication system 300 using a wireless communication link. For example, wireless devices 302 and 304 can include a cell phone, a smart phone, a computing platform such as a laptop, palmtop, or a tablet, a personal digital assistant, or an internet access device, and combinations thereof.

Access node 306 is a network node capable of providing wireless communications to wireless devices 302 and 304, and can be, for example, a base transceiver station, a radio base station, or an eNodeB device. In an embodiment, access node 306 can comprise a serving access node for wireless devices 302 and 304. Access node 306 may communicate with controller node 308 over communication link 318 and with gateway node 310 over communication link 320. Access node 306 may comprise one or more antennas. An antenna may comprise an electrical device or component that transforms electric power into radio waves. One or more antennas of access node 306 may transmit signals over a signal area for the access node and/or receive signals from wireless devices (e.g., wireless devices 302 and 304). In an embodiment, one or more antennas may be used to provide wireless services over a signal area for a particular sector of access node 306.

Controller node 308 can be any network node configured to manage services within system 300. Controller node 308 may provide other control and management functions for system 300. The controller node 308 can be a single device having various functions or a plurality of devices having differing functions. For example, controller node 308 can include at least one of a multi-cell/multicast coordination entity (MCE), a mobility management entity (MME), a radio network controller (RNC), a mobile switching center (MSC), and a combination thereof.

Controller node 308 can comprise a processor and associated circuitry to execute or direct the execution of computer-readable instructions to obtain information. Controller node 308 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 308 can receive instructions and other input at a user interface. Controller node 308 can comprise a processor and associated circuitry to execute or direct the execution of computer-readable instructions to obtain information.

Gateway node 310 is a network element which can comprise a processor and associated circuitry to execute or direct the execution of computer-readable instructions. Gateway node 310 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 310 can provide instructions to access node 306 related to channel selection in communications with wireless devices 302 and 304. For example, gateway node 310 can comprise at least one of a serving gateway (SGW), a packet data network gateway (PDNGW), a cellular gateway (CGW), and a combination thereof.

Communication network 312 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 312 may also comprise base stations, wireless communication nodes, telephony switches, internet routers, network gateways, computer systems, communication links, or some other type of communication equipment, and combinations thereof. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 312 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 314, 316, 318, 320, 322, and 324 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Other wireless protocols can also be used.

Other network elements may be present in the communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access node 306, controller node 308, gateway node 310, and communication network 312 which are omitted for clarity, including additional processing nodes, routers, gateways, and physical and/or wireless data links for carrying data among the various network elements.

Figure 5:
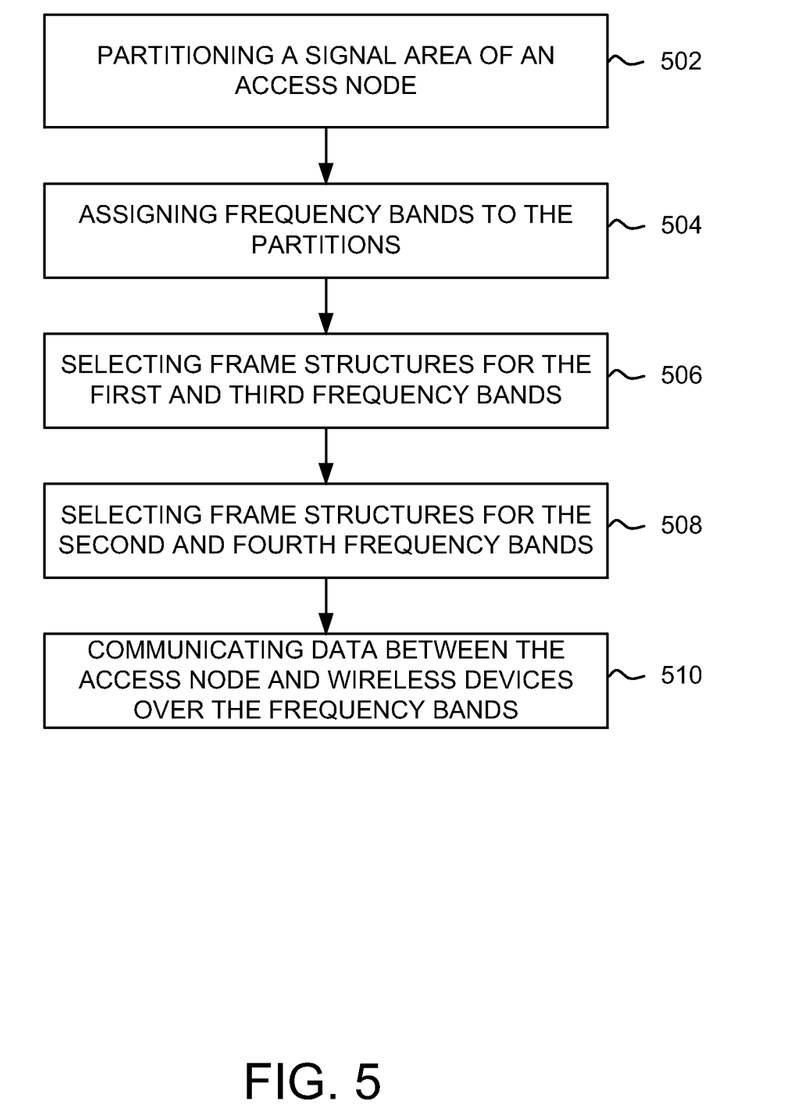
FIG. 5 illustrates another exemplary method of determining frame structures for frequency bands.

In an embodiment, any of controller node 308, gateway node 310, and one or more modules of access node 306 may perform all or parts of the methods of FIGS. 2 and 5.

Figure 4:
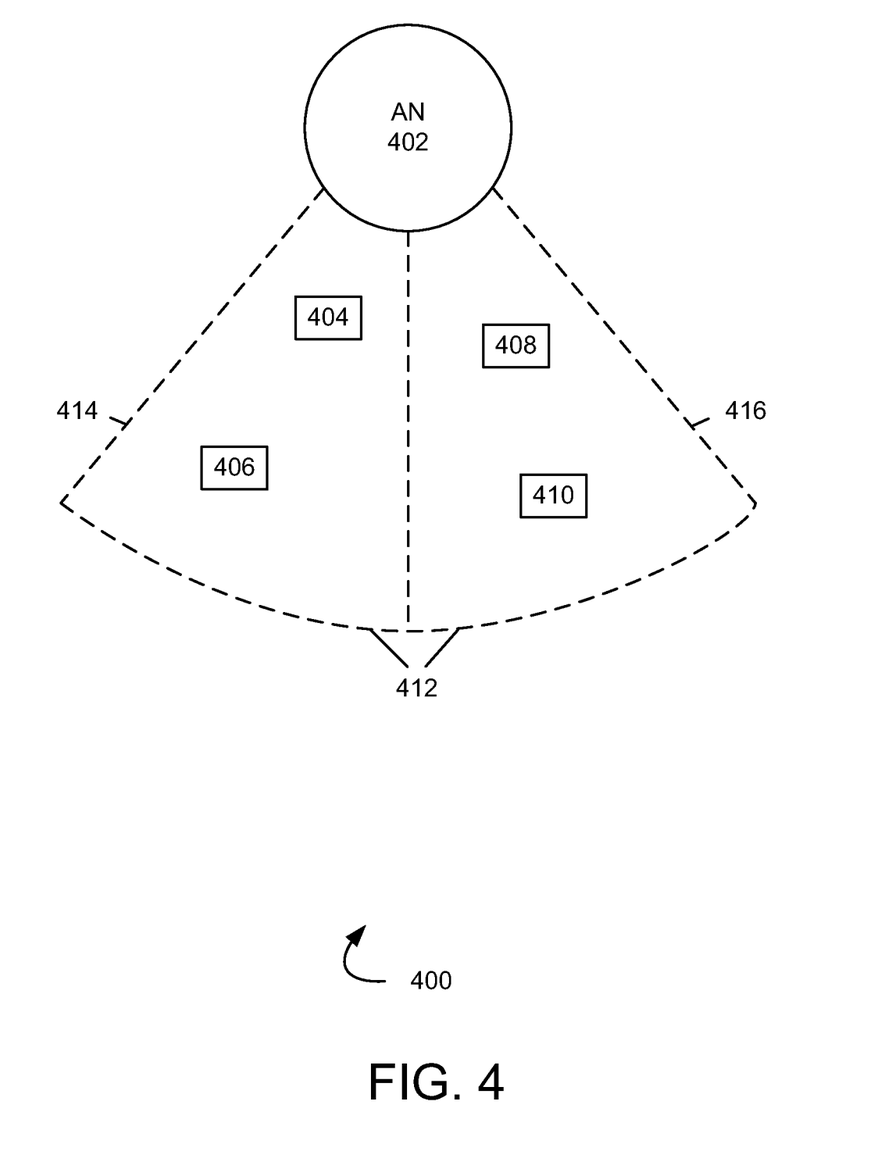
FIG. 4 illustrates another exemplary communication system to determine frame structures for frequency bands.

FIG. 4 illustrates exemplary communication systems 400 for determining frame structures for frequency bands. System 400 may comprise access node 402, wireless devices 404, 406, 408, and 410, signal area 412, and signal area partitions 414 and 416. Access node 402 may comprise an access node similar to access node 306 and wireless devices 404, 406, 408, and 410 may comprise wireless devices similar to wireless device 302.

Signal area 412 may comprise an area around access node 402 where a wireless device may detect wireless signals transmitted from the access node (e.g., detect at a signal level above a threshold). For example, signal area 412 may comprise a coverage area for access node 402. In an embodiment, signal area 412 may be a predefined area over which access node 402 provides wireless services to wireless devices. For example, signal area 412 may comprise a cell and/or sector of access node 402. In an embodiment, one or more antennas of access node 402 may provide wireless service (e.g., to wireless devices) over signal area 412. Signal area partitions 414 and 416 may comprise two partition areas that comprise signal area 412. Accordingly, signal area partitions 414 and 416 may comprise partitions of a signal area, sector, or cell of access node 402.

In operation, access node 402 may establish communication with wireless devices 404, 406, 408 and 410 such that access node 402 provides the wireless devices access to a communication network (e.g., communication network 312). In an embodiment, system 300 may use a plurality of carriers in order to provide wireless communication services. A plurality of carriers that comprise bandwidth for wireless communications (e.g., 2.5 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, access node 402 may communicate with wireless devices 404, 406, 408, and 410 using a time division duplex (TDD) system. For example, in TDD system, a frame may comprise a number of subframes (e.g. Transmission Time Intervals, TTIs) that include a mix of uplink subframes and downlink subframes. In some embodiments, a special subframe may also be used, for instance, as a guard between an uplink subframe and a downlink subframe or for any other suitable purpose. When using a TDD structure, an uplink subframe and a downlink subframe may be transmitted over the same frequency but at different times.

Access node 402 may use one or more frame structures to communicate with wireless devices 404, 406, 408, and 410. In an embodiment, a frame structure may comprise uplink subframes, downlink subframes, and special subframes, where each frame structure may comprise a different mix of subframes. For example, a first frame structure may comprise 10 subframes, where the order of subframes may comprise downlink, special, uplink, uplink, downlink, downlink, special, uplink, uplink, and downlink. A second frame structure may comprise 10 subframes, where the order of subframes may comprise downlink, special, uplink, uplink, downlink, downlink, downlink, downlink, downlink, and downlink. Other frame structure may comprise various other mixes of special, downlink, and uplink configurations.

In an embodiment, allowing multiple frame structures to be used within a signal area (e.g., sector) may be beneficial. For example, system 300 may benefit from using a first frame structure that comprises a minimum number of downlink subframes and a second frame structure that comprises a minimum number of uplink subframes. However, where contiguous blocks of spectrum (e.g., contiguous frequency bands) implement different frame structures within a signal area (e.g., sector), interference may degrade channel qualities in certain circumstances. Accordingly, a system that enables multiple frame structures to be used within a signal area may provide enhanced wireless services.

FIG. 5 illustrates an exemplary method for determining frame structures for frequency bands. The method will be discussed with reference to the exemplary communication system 400 illustrated in FIG. 4, however, the method can be implemented with any suitable communication system.

Referring to FIG. 5, at step 502, a signal area may be partitioned into a first partition and a second partition, wherein a first antenna is associated with the first partition and a second antenna is associated with the second partition. For example, signal area 412 may be partitioned into partition 414 and partition 416. Signal area 412 may be partitioned based on geographical area for the signal area where partitions 414 and 416 may each cover a threshold amount of geographic area. In another example, signal area 412 may be partitioned based on wireless devices within the signal area (e.g., based on historic data), where partitions 414 and 416 may each encompass a threshold number of wireless devices (e.g., threshold number of estimated wireless devices based on historic data). Signal area 116 may also be partitioned in any other suitable manner.

In an embodiment, access node 402 may comprise a plurality of antennas. Partition 414 may be associated with a first antenna and partition 416 may be associated with a second antenna. In some embodiments, partition 414 may be associated with a plurality of first antennas and partition 416 may be associated with a plurality of second antennas. Access node 402 may implement a multiple implement multiple output (MIMO) protocol. In an example, where partitions 414 and 416 are associated with a plurality of antennas, each partition may further implement a MIMO protocol. When an antenna, or multiple antennas, are associated with a partition, those antennas may provide wireless services (e.g., to wireless devices) over the associated partition. For example, where partition 414 is associated with a first antenna and partition 416 is associated with a second antenna, the first antenna may provide wireless services (e.g., communicate with wireless devices) over partition 414 and the second antenna may provide wireless services (e.g., communicate with wireless devices) over partition 416.

At step 504, the first partition may be assigned a first frequency band and a third frequency band and the second partition may be assigned a second frequency band and a fourth frequency band. For example, access node 402 may communicate using a plurality of frequency bands, and at least a first, second, third, and fourth frequency band. Each frequency band may comprise a determined Mhz bandwidth (e.g., 5 Mhz, 10 Mhz, 15 Mhz, 20 Mhz, and the like). Partition 414 may be assigned a first frequency band and a third frequency band and partition 416 may be assigned a second frequency band and a fourth frequency band.

In an embodiment, the first, second, third, and fourth frequency bands may comprise a contiguous block of spectrum (e.g., contiguous frequency bands). For example, where each frequency bands comprises a 10 Mhz channel, the four channels may comprise a 40 Mhz block of spectrum. In a further embodiment, the contiguous block of spectrum may be in order from the first frequency band to the fourth frequency band. For example, the first frequency band may be adjacent to the second frequency band, the second frequency band may be adjacent to the third frequency band, and the third frequency band may be adjacent to the fourth frequency band. In an embodiment, the first frequency band may not be adjacent to the third frequency band and the second frequency band may not be adjacent to the fourth frequency band.

At step 506, frame structures may be selected for the frequency bands, where a first frame structure may be selected for the first frequency band and a third frame structure may be selected for the third frequency band, and where the first frame structure differs from the third frame structure. For example, the first frame structure and the third frame structure may be used by access node 402 for communications with wireless devices served within partition 414 (e.g. connected to partition 414).

In an embodiment, one the first frame structure and the third frame structure meets an uplink criteria. For example, a frame structure that meets an uplink criteria may comprise a minimum number of uplink subframes (e.g., minimum absolute number or minimum percentage of the frame). For example, a frame structure that meets an uplink criteria may comprise at least a threshold number of subframes that comprise uplink subframes (e.g., 3 subframes, 4 subframes, 5 subframes, at least 30% of subframes, at least 40% of subframes, at least 50% of subframes, and the like).

Figure 6:
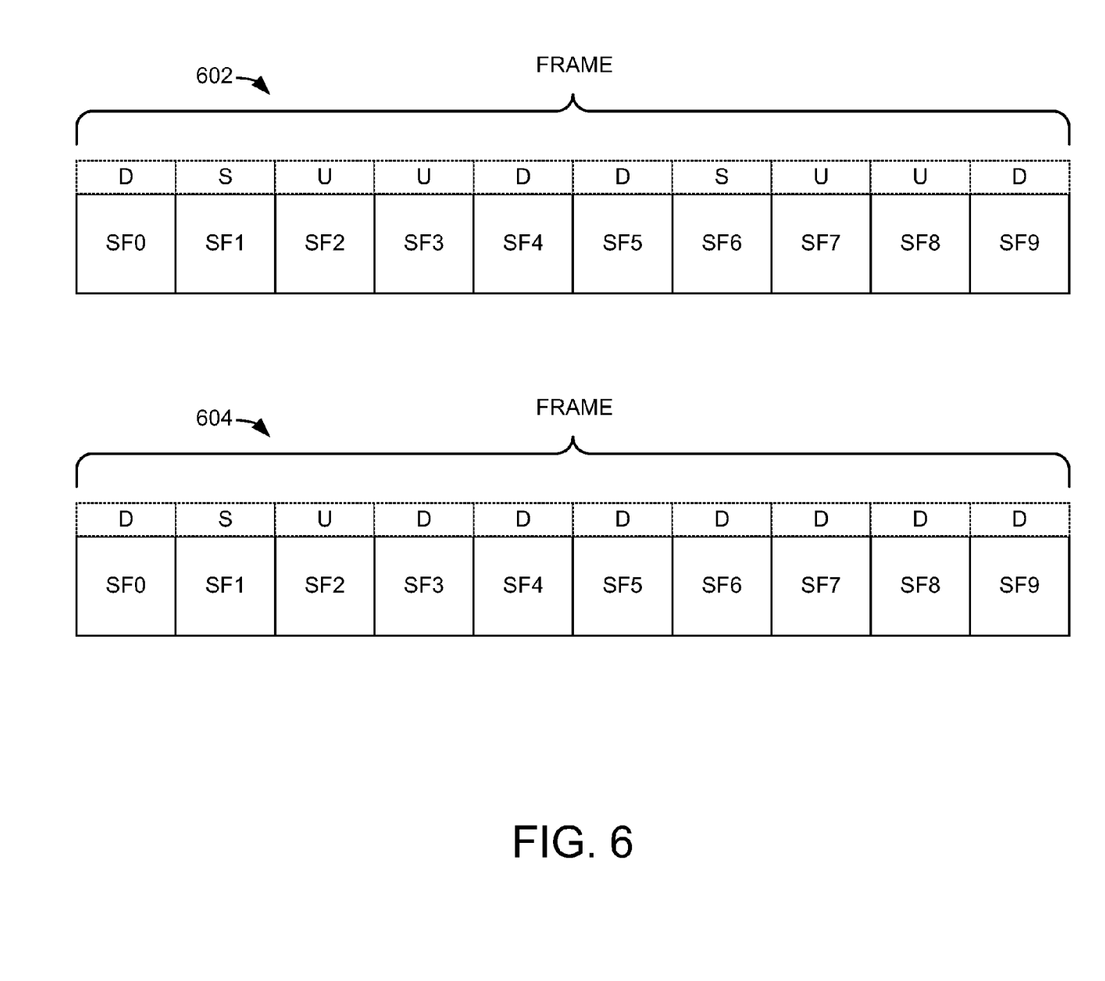
FIG. 6 illustrates exemplary frame structures.

FIG. 6 illustrates sample frame structures in an embodiment. For example, each of frame structures 602 and 604 may comprise 10 subframes. The subframe sequence for frame structure 602 may comprise downlink, special, uplink, uplink, downlink, downlink, special, uplink, uplink, and downlink. The subframe sequence for frame structure 604 may comprise downlink, special, uplink, downlink, downlink, downlink, downlink, downlink, downlink, and downlink. In an embodiment, frame structure 602 may show a frame structure that meets an uplink criteria.

In an embodiment, one the first frame structure and the third frame structure meets a downlink criteria. For example, a frame structure that meets a downlink criteria may comprise a minimum number of downlink subframes (e.g., minimum absolute number or minimum percentage of the frame). For example, a frame structure that meets a downlink criteria may comprise at least a threshold number of subframes that comprise downlink subframes (e.g., 5 subframes, 6 subframes, 7 subframes, at least 50% of subframes, at least 60% of subframes, at least 70% of subframes, and the like). In an embodiment, frame structure 604 may show a frame structure that meets a downlink criteria.

For example, the first frame structure may meet the uplink criteria and the third frame structure may meet the downlink criteria. Accordingly, access node 402 may use the first frame structure when communicating over the first frequency band and may use the third frame structure when communicating using the third frequency band. In an embodiment, a frame structure that meets the uplink criteria (e.g., the first frame structure) may comprise twice as many uplink subframes as a frame structure that meets the downlink criteria (e.g., the third frame structure). In an embodiment, although the first frequency band uses the first frame structure and the third frequency band uses the third frame structure, interference may be mitigated between the first frequency band and the third frequency band because these bands are not adjacent to one another.

In an embodiment, each frequency band that uses a particular frame structure may comprise a signal area. For example, the first frame structure may meet the uplink criteria and the third frame structure may meet the downlink criteria. When access node 402 communicates over the first frequency band, the area around the access node where wireless devices may communicate with access node 402 may be different than when access node 402 communicates over the third frequency band. In this example, access node 402 may be able to communicate with wireless devices over a larger signal area when communicating using the first frequency band than when communicating using the third frequency band. In an embodiment, a coverage area for frequency bands that use a frame structure that meets the uplink criteria is greater than a coverage area for frequency bands that use a frame structure that meets the downlink criteria.

At step 508, frame structures may be selected for the frequency bands, where a second frame structure may be selected for the second frequency band and a fourth frame structure may be selected for the fourth frequency band, and where the second frame structure differs from the fourth frame structure. For example, the second frame structure and the fourth frame structure may be used by access node 402 for communications with wireless devices served within partition 416 (e.g., connected to partition 416).

In an embodiment, one the second frame structure and the fourth frame structure meets an uplink criteria. For example, a frame structure that meets an uplink criteria may comprise a minimum number of uplink subframes (e.g., minimum absolute number or minimum percentage of the frame). For example, a frame structure that meets an uplink criteria may comprise at least a threshold number of subframes that comprise uplink subframes (e.g., 3 subframes, 4 subframes, 5 subframes, at least 30% of subframes, at least 40% of subframes, at least 50% of subframes, and the like). In an embodiment, frame structure 602 may show a frame structure that meets an uplink criteria.

In an embodiment, one the second frame structure and the fourth frame structure meets a downlink criteria. For example, a frame structure that meets a downlink criteria may comprise a minimum number of downlink subframes (e.g., minimum absolute number or minimum percentage of the frame). For example, a frame structure that meets a downlink criteria may comprise at least a threshold number of subframes that comprise downlink subframes (e.g., 5 subframes, 6 subframes, 7 subframes, at least 50% of subframes, at least 60% of subframes, at least 70% of subframes, and the like). In an embodiment, frame structure 604 may show a frame structure that meets a downlink criteria.

In an embodiment, the second frame structure may meet the uplink criteria and the fourth frame structure may meet the downlink criteria. Accordingly, access node 402 may use the second frame structure when communicating over the second frequency band and may use the fourth frame structure when communicating using the fourth frequency band. In an embodiment, a frame structure that meets the uplink criteria (e.g., the second frame structure) may comprise twice as many uplink subframes as a frame structure that meets the downlink criteria (e.g., the fourth frame structure). In an embodiment, although the second frequency band uses the second frame structure and the fourth frequency band uses the fourth frame structure, interference may be mitigated between the second frequency band and the fourth frequency band because these bands are not adjacent to one another.

In an embodiment, each frequency band that uses a particular frame structure may comprise a signal area. For example, the second frame structure may meet the uplink criteria and the fourth frame structure may meet the downlink criteria. When access node 402 communicates over the second frequency band, the area around the access node where wireless devices may communicate with access node 402 may be different than when access node 402 communicates over the fourth frequency band. In this example, access node 402 may be able to communicate with wireless devices over a larger signal area when communicating using the second frequency band than when communicating using the fourth frequency band. In an embodiment, a coverage area for frequency bands that use a frame structure that meets the uplink criteria is greater than a coverage area for frequency bands that use a frame structure that meets the downlink criteria.

At step 510, data may be communicated between the access node and a plurality of wireless devices over each of the first, second, third, and fourth frequency bands using each respective frame structure selected for each frequency band. For example, access node 402 may communicate with a plurality of wireless devices (e.g., wireless device 404 and 406) served within partition 414 (e.g., connected to partition 414) over the first frequency band using the first frame structure and/or over the third frequency band using the third frame structure. In another example, access node 402 may communicate with a plurality of wireless devices (e.g., wireless devices 408 and 410) served within partition 416 (e.g., connected to partition 416) over the second frequency band using the second frame structure and/or over the fourth frequency band using the fourth frame structure. In an embodiment, the communication may comprise communicating data from access node 402 to a wireless device (e.g., downlink communication) using a downlink subframe and communicating data from a wireless device to access node 402 (e.g., uplink communication) using an uplink subframe.

In an embodiment, although two partitions are illustrated and described, a plurality of partitions may be implemented, and frequency bands (and/or frame structures) may be assigned to such partitions in a manner similar to those described above. In addition, although four frequency bands are illustrated and described, a plurality of frequency bands may be implemented.

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 7:
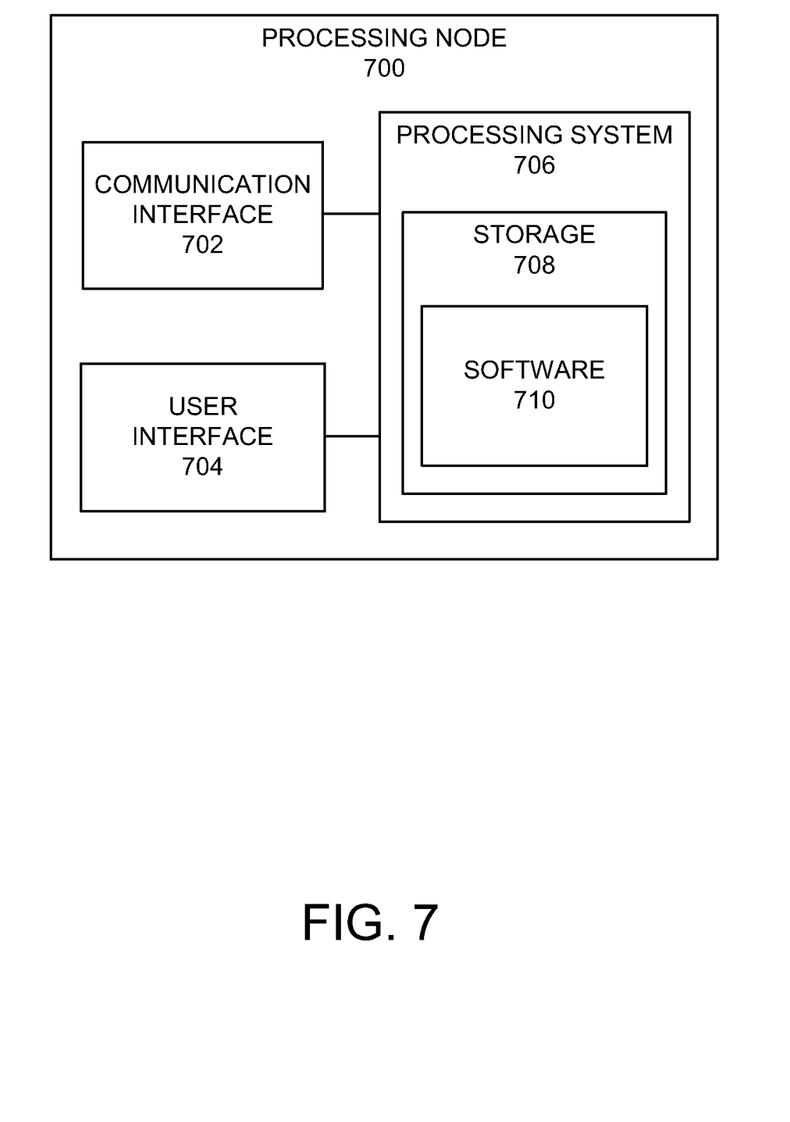
FIG. 7 illustrates an exemplary processing node.

FIG. 7 illustrates an exemplary processing node 700 in a communication system. Processing node 700 comprises communication interface 702, user interface 704, and processing system 706 in communication with communication interface 702 and user interface 704. Processing node 700 can be configured to determine a communication access node for a wireless device. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

Examples of processing node 700 include controller node 308 and gateway node 310. Processing node 700 can also be an adjunct or component of a network element, such as an element of access nodes 106 or 306 and the like. Processing node 700 can also be another network element in a communication system. Further, the functionality of processing node 700 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for determining a frame structures for frequency bands, the method comprising:
partitioning a signal area of an access node into at least a first partition and a second partition, wherein a first antenna is associated with the first partition and a second antenna is associated with the second partition;
assigning the first partition a first frequency band and a third frequency band and the second partition a second frequency band and a fourth frequency band;
selecting a first frame structure for the first frequency band, a second frame structure for the second frequency band, a third frame structure for the third frequency band, and a fourth frame structure for the fourth frequency band, wherein each frame structure comprises a mix of uplink subframes and downlink subframes, and the first frame structure differs from the third frame structure and the second frame structure differs from the fourth frame structure; and
communicating data between the access node and a plurality of devices over each of the first, second, third, and fourth frequency bands using each respective frame structure selected for each frequency band.

2. The method of claim 1, wherein one of the first frame structure and the third frame structure meets an uplink criteria and one of the first frame structure and the third frame structure meets a downlink criteria.

3. The method of claim 2, wherein one of the second frame structure and the fourth frame structure meets an uplink criteria and one of the second frame structure and the fourth frame structure meets a downlink criteria.

4. The method of claim 3, wherein the first frequency band, second frequency band, third frequency band, and fourth frequency band comprise a contiguous block of spectrum.

5. The method of claim 4, wherein the contiguous block of spectrum is ordered from the first frequency band to the fourth frequency band.

6. The method of claim 4, wherein the first frequency band is not adjacent to the third frequency band and the second frequency band is not adjacent to the fourth frequency band.

7. The method of claim 3, wherein a coverage area for frequency bands that use a frame structure that meets the uplink criteria is greater than a coverage area for frequency bands that use a frame structure that meets the downlink criteria.

8. The method of claim 3, wherein a selected frame structure that meets the uplink criteria comprises at least twice as many uplink subframes as a selected frame structure that meets the downlink criteria.

9. The method of claim 3, wherein the uplink criteria comprises a minimum number of uplink subframes in a frame structure and the downlink criteria comprises a minimum number of downlink subframes in a frame structure.

10. The method of claim 1, wherein the signal area comprises a sector of the access node.

11. A system for determining a frame structures for frequency bands, the system comprising:
a processing node with a processor configured to:
partition a signal area of an access node into at least a first partition and a second partition, wherein a first antenna is associated with the first partition and a second antenna is associated with the second partition;
assign the first partition a first frequency band and a third frequency band and the second partition a second frequency band and a fourth frequency band;
select a first frame structure for the first frequency band, a second frame structure for the second frequency band, a third frame structure for the third frequency band, and a fourth frame structure for the fourth frequency band, wherein each frame structure comprises a mix of uplink subframes and downlink subframes, and the first frame structure differs from the third frame structure and the second frame structure differs from the fourth frame structure; and
communicate data between the access node and a plurality of devices over each of the first, second, third, and fourth frequency bands using each respective frame structure selected for each frequency band.

12. The system of claim 11, wherein one of the first frame structure and the third frame structure meets an uplink criteria and one of the first frame structure and the third frame structure meets a downlink criteria.

13. The system of claim 12, wherein one of the second frame structure and the fourth frame structure meets an uplink criteria and one of the second frame structure and the fourth frame structure meets a downlink criteria.

14. The system of claim 13, wherein the first frequency band, second frequency band, third frequency band, and fourth frequency band comprise a contiguous block of spectrum.

15. The system of claim 14, wherein the contiguous block of spectrum is ordered from the first frequency band to the fourth frequency band.

16. The system of claim 14, wherein the first frequency band is not adjacent to the third frequency band and the second frequency band is not adjacent to the fourth frequency band.

17. The system of claim 13, wherein a coverage area for frequency bands that use a frame structure that meets the uplink criteria is greater than a coverage area for frequency bands that use a frame structure that meets the downlink criteria.

18. The system of claim 13, wherein a selected frame structure that meets the uplink criteria comprises at least twice as many uplink subframes as a selected frame structure that meets the downlink criteria.

19. The system of claim 13, wherein the uplink criteria comprises a minimum number of uplink subframes in a frame structure and the downlink criteria comprises a minimum number of downlink subframes in a frame structure.

20. The system of claim 11, wherein the signal area comprises a sector of the access node.

* * * * *